July 15, 1958
N. B. GRANBERG
2,843,725
BOX SECTION AND METHOD OF MAKING
Filed March 24, 1955
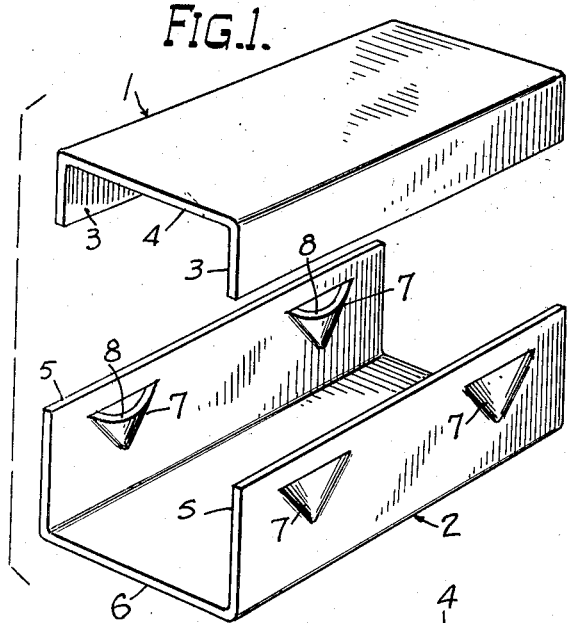
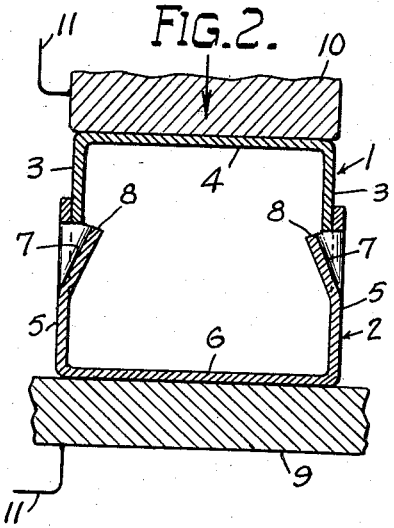
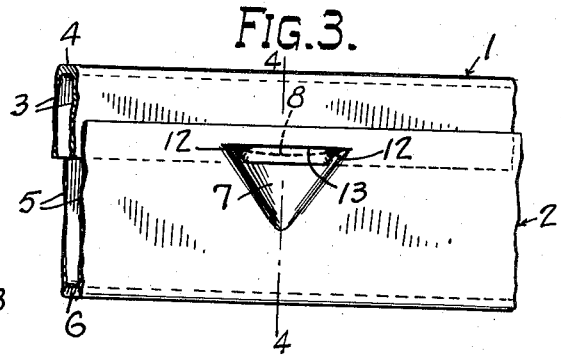
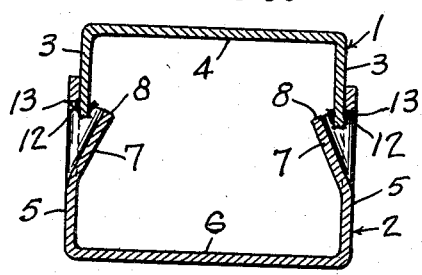
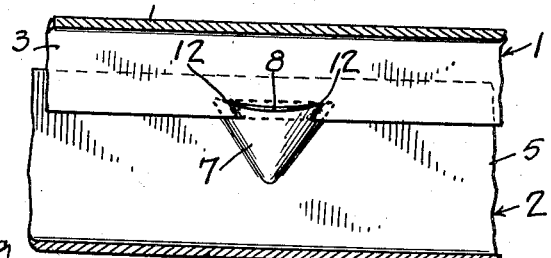
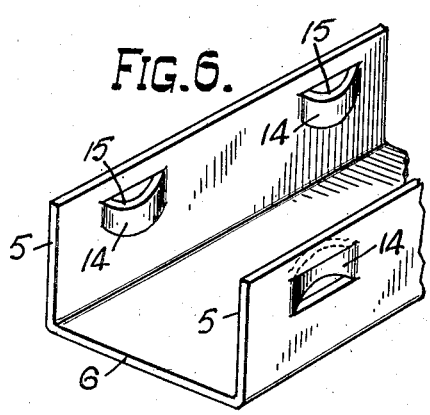
INVENTOR.
Neil B. Granberg
BY *Andrus & Scales*
ATTORNEYS.

United States Patent Office 2,843,725
Patented July 15, 1958

2,843,725

BOX SECTION AND METHOD OF MAKING

Neil B. Granberg, Wauwatosa, Wis., assignor to A. O. Smith Corporation, Milwaukee, Wis., a corporation of New York Application March 24, 1955, Serial No. 496,397

6 Claims. (Cl. 219—105)

This invention relates to a method of making box sections and the article formed thereby, and more particularly to a method of making metal box sections for vehicle frames and the like, said box sections being formed from a pair of channel members.

Heretofore, box frames for motor vehicles have usually been made of a pair of channel members which were fitted together so that their flanges overlapped. These channel members were secured together by making a longitudinal arc weld between the ends of the flanges of the outermost channel and the outer surfaces of the flanges of the other channel. Various means were provided to properly index the channel members for welding. The arc welding and indexing procedure has proved to be time-consuming and costly.

The present invention substantially eliminates the need for arc welding and utilizes the exposed surfaces of triangular depressions provided in the body of the flanges of one channel for resistance welding thereto of the other channel to produce a resistance welded box section of superior strength and rigidity.

The accompanying drawing illustrates the best mode presently contemplated by the inventor for carrying out the invention.

In the drawing:

Figure 1 is a perspective view of upper and lower channel members prior to welding and showing triangular depressions formed in the flanges of the lower channel;

Fig. 2 is a section through the channel members at the beginning of the welding operation and showing the welding apparatus schematically;

Fig. 3 is a fragmentary side elevation of the box member after completion of welding;

Fig. 4 is a transverse section of the box member taken on line 4—4 of Fig. 3;

Fig. 5 is a fragmentary elevational view of one of the weld areas taken from the inside of the box member; and Fig. 6 is a broken perspective view of a lower channel member incorporating another embodiment of the invention.

The box section of the inevntion as shown in the drawings comprises upper and lower channel members 1 and 2 of suitable plate stock which are joined together by resistance welding to form the required structure. The upper channel 1 comprises a pair of spaced flanges 3 joined by a web 4 and lower channel 2 comprises a pair of spaced flanges 5 joined by a web 6. Web 4 is narrower than web 6 so that channel 1 may be fitted into channel 2 with the flanges 3 being overlapped by flanges 5.

A plurality of triangularly shaped longitudinally spaced depressions 7 are provided in each flange 5 adjacent the upper longitudinal edges of the flanges. These depressions are formed by making longitudinal slits in flanges 5 and then punching the metal inwardly to form, in essence, a triangle having its base along the slit line. Depressions 7 are bowed inwardly so that the base of the triangle provides an upwardly facing arcuate edge or lip 8. All of the lips 8 are spaced an equal distance from the upper or free longitudinal edges of flanges 5 and lie in the same horizontal plane.

Assembly of channels 1 and 2 into a box section may be accomplished as follows:

Lower channel 2 is placed on a bed 9 in a press or the like, not shown. Upper channel 1 is then placed over channel 2 so that their respective flanges are in overlapping relationship and the lower edges of flanges 3 are resting on lips 8.

A ram member 10 is disposed above channel 1 and is adapted to push downwardly thereupon. As shown, bed 9 and ram 10 constitute electrodes which are connected by leads 11 to a suitable source of welding current, not shown. Other means to supply welding current to the channels may be used.

To form the box member, the electric current is turned on, which heats up the areas of contact between channels 1 and 2. It has been found that this resistance heating action occurs primarily at the line of contact between lips 8 of triangles 7 and the exposed edges of flanges 3. After the metal has softened sufficiently, ram 10 is actuated to mash channel 1 into triangles 7 and thereby weld the channels together.

The necessary currents, heating action and ram pressures will depend on the composition and dimensions of the particular channels.

As best seen in Fig. 5, the edges of upper channel 1 are forced into triangles 7 and into overlapping relationship with lips 8 and become firmly secured thereto by the welding operation. At the same time, a portion of the edge of each flange 3 is mashed by each lip 8 and is pushed outwardly to form two projections 12 which extend over the unbowed edge 13 of the slit which was made in forming each triangle 7. This is best seen in Fig. 4.

Projections 12 become welded to the sides of each triangle, and at the same time lock the channel members together. If any of the mash welds should break, projections 12 will prevent the channels from separating by virtue of their extending outwardly over edge 13. Any movement to separate channels 1 and 2 will be prevented by projections 12 abutting against edge 13.

If desired, arc welds may be made between the edges of channel 2 and flanges 3 of channel 1 to further secure the box section. This, however, is unnecessary if a sufficient number of triangles are provided for mash welding.

Fig. 6 shows another embodiment of the invention in which inwardly extending arcuate loops 14 having upwardly facing lips 15 are used in the welding process. Loops 14 may be formed by cutting two longitudinally extending slits in flanges 5 and then bowing the metal inwardly between the slits.

The invention provides a novel method of forming box sections in which one channel member is welded to inwardly extending depressions of the flanges of the other channel member. The lips formed in these depressions serve as contact means for purposes of electric resistance heating, and also serve to cut the edges of the other channel member in the mash welding step to facilitate welding and locking the channels together.

Costly and time consuming arc welding procedures may be dispensed with without sacrificing strength or rigidity of the box section.

Various modes of carrying out the invention are contemplated as within the scope of the following claims, which particularly point out and distinctly claim the subject matter regarded as the invention.

I claim:

1. A method of forming a box section from a pair of channel members with each member having longitudinally extending flanges joined by a web, which comprises, forming a plurality of depressions in the flanges of one channel member to provide by each depression a surface facing in the same direction as the longitudinal edge of the respective flange and so that said surface is disposed between said edge face and said web and is spaced transversely from the body of each flange, bringing the edges of the flanges of a second channel member in contact with the surfaces of said depressions of the first named channel member, passing a resistance heating current between the edges of the flanges of the second channel member and said depression surfaces, and mashing the flanges and depression surfaces of said channels together to form a welded box member of high strength and rigidity.

2. The method of forming a box member from a pair of metal channels with each channel having spaced longitudinally extending flanges joined by a web, comprising, forming a plurality of lips in the flanges of one of the channels so that the lips formed in each flange are in the same plane and are disposed between the longitudinal edge of the flange and said web and are transversely spaced from the body of each flange, bringing the longitudinal edges of the flanges of the second channel in contact with said lips to accurately position and index the channels, passing a resistance heating current between the flanges of said second-named channel and said lips to soften the same, and mashing said channels together so that said lips cut into said last-named flanges to weld the two channels together.

3. The method of forming a box member from a pair of metal channel members with each member having spaced longitudinally extending flanges joined by a web, comprising, forming a plurality of longitudinally extending slits in the flanges of one channel member and so that the slits in each flange are in a common plane and with the slits being disposed between the longitudinal edge of the respective flange and said web, punching the metal between the slits and the web in a direction transverse to the extent of said flanges to provide depressions in said flanges to provide each depression with an arcuate lip, bringing the flanges of the second channel member into overlapping relation with the flanges of the first channel member so that the longitudinal edges of the flanges of the second channel member are in contact with said lips, passing an electric current between said last-named flanges and said lips to resistance heat the same, and mashing said last-named flanges into the lips of said depressions whereby said channel members are welded together and are prevented from separating upon possible failure of the weld by the formation of projections which overlap the undepressed edges of the slits.

4. The method of forming a metal box member from a pair of channel members with each channel member having spaced longitudinally extending flanges joined by a web, comprising, forming longitudinally spaced pairs of transversely spaced slits in the flanges of one channel member so that said slits are disposed between the longitudinal edges of the flanges and the respective joining web, forcing the metal between each pair of slits away from the flanges to form a loop which provides an outwardly facing arcuate lip, bringing the flanges of the other channel member into overlapping relation with the flanges of the first channel member so that the longitudinal edges of the flanges of said other channel member are in contact with said lips, passing a resistance heating current between said last-named flanges and said lips, and mashing said last-named flanges into said loops to weld the pair of channels together.

5. A metal box section comprising, a pair of channel members with each member having a pair of longitudinally extending flanges joined by a web, a plurality of longitudinally extending lips disposed in the flanges of one member with each lip being disposed between the longitudinal edge of the respective flange and the web, each lip being transversely spaced from the body of each flange and having an edge facing in the same direction as the edges of said flanges, the flanges of the other channel member overlapping the flanges of the first-named member and welded in overlapping and interlocking relationship to the lips in said first-named member.

6. A metal box section comprising, a pair of channel members having spaced flanges joined by a web, a plurality of longitudinally extending slits disposed in the flanges of one member with said slits being spaced from the edges of the flanges, one edge of each slit being bowed inwardly transversely of the body of the respective flange to form a depression having a semi-circular extending lip disposed between the slit and said web and with said lip facing in the same direction as the edge of its respective flange, the flanges of the unslitted channel member overlapping the flanges of the slitted channel member and overlapping and engaging said lips, and a mash weld securing the edges portions of the flanges of the unslitted channel member to said lips with said mash weld providing projections on the lips which overlap the unbowed edges of said slits and interlock the channels together.

References Cited in the file of this patent

UNITED STATES PATENTS

| | | |
|---|---|---|
| 219,335 | Wilson | Sept. 2, 1879 |
| 999,267 | Slick | Aug. 1, 1911 |
| 1,166,399 | Brandt | Dec. 28, 1915 |
| 1,929,692 | Johnson | Oct. 10, 1933 |
| 1,937,997 | Townsend | Dec. 5, 1933 |
| 2,065,494 | Gruelich | Dec. 22, 1936 |
| 2,734,117 | Randall | Feb. 7, 1956 |